(12) United States Patent
Kimura

(10) Patent No.: US 8,084,943 B2
(45) Date of Patent: Dec. 27, 2011

(54) PLASMA DISPLAY PANEL WITH FRONT FILTER

(75) Inventor: Syunsuke Kimura, Hyogo (JP)

(73) Assignee: Panasonic Corporation, Osaka (JP)

( * ) Notice: Subject to any disclaimer, the term of this patent is extended or adjusted under 35 U.S.C. 154(b) by 81 days.

(21) Appl. No.: 12/744,580

(22) PCT Filed: Nov. 27, 2008

(86) PCT No.: PCT/JP2008/003498
§ 371 (c)(1),
(2), (4) Date: May 25, 2010

(87) PCT Pub. No.: WO2009/069303
PCT Pub. Date: Jun. 4, 2009

(65) Prior Publication Data
US 2010/0259157 A1 Oct. 14, 2010

(30) Foreign Application Priority Data
Nov. 27, 2007 (JP) ................................. 2007-306145

(51) Int. Cl.
*H01J 17/49* (2006.01)
(52) U.S. Cl. ........................................ 313/582; 313/112
(58) Field of Classification Search .................. 313/582, 313/112
See application file for complete search history.

(56) References Cited

U.S. PATENT DOCUMENTS

| 2006/0250064 | A1 | 11/2006 | Park et al. |
| 2010/0177397 | A1* | 7/2010 | Kamiyama et al. ........... 359/609 |

FOREIGN PATENT DOCUMENTS

| JP | 5-278157 | 10/1993 |
| JP | 2000-275401 | 10/2000 |
| JP | 2005-316450 | 11/2005 |
| JP | 2006-313360 | 11/2006 |

* cited by examiner

*Primary Examiner* — Karabi Guharay
(74) *Attorney, Agent, or Firm* — Hamre, Schumann, Mueller & Larson, P.C.

(57) ABSTRACT

Disclosed is a plasma display panel wherein reduction of reflection and improvement in contrast and sharpness of image light can be attained at the same time. Specifically disclosed is a plasma display panel (10) comprising a front plate (200) and a back plate (100) arranged at a distance from each other, a partition wall (110) for dividing the discharge space formed between the front plate (200) and the back plate (100), a phosphor layer (130) formed within a discharge cell (120) defined by the partition wall (110), electrodes respectively arranged on the front plate (200) and the back plate (100) for producing a discharge within the discharge cell (120), and a front filter (300) arranged on the viewer side of the front plate (200). The front filter (300) has two resin layers (320, 330) having different refractive indexes on the viewer side, and the viewer side surface of the front filter (300) and the interface between the two resin layers (320, 330) respectively have fine recesses and projections.

2 Claims, 7 Drawing Sheets

PLASMA DISPLAY PANEL WITH FRONT FILTER

TECHNICAL FIELD

The present invention relates to a plasma display panel. More particularly, the present invention relates to a plasma display panel in which a front filter is placed.

BACKGROUND ART

Self-luminous displays such as plasma displays or CRT (cathode-ray tube) displays are widely used because they provide natural images without dependency on viewing angles. Particularly, plasma displays are thin and optimal to form a large screen, and are therefore becoming popular rapidly.

However, various display apparatuses including plasma displays have a problem of "glare" that deteriorates the visibility of displayed images. Glare in a display apparatus occurs when light from fluorescent lights in the room or the image of the viewer enters as light from the outside, into a plurality of flat planes that are provided closer to the side on which the person viewing images (hereinafter "viewer") is positioned, than to a display section, and is reflected regularly on those planes.

Therefore, a filter with the function of preventing glare (i.e. anti-glare function) has been conventionally proposed (see, for example, Patent Document 1). With the filter disclosed in Patent Document 1, a concave-convex shape is formed in the frontmost surface by scattering portions where fine particles are aggregated. By placing this filter on the viewer side of the display apparatus, it is possible to diffuse and reflect light from the outside, on the frontmost surface of the filter, and improve glare. This filter, having an anti-glare function and placed on the viewer side of the display apparatus, will be hereinafter referred to as "front filter."

Patent Document 1: Japanese Patent Application Laid-Open No. 2005-316450

DISCLOSURE OF INVENTION

Problems to be Solved by the Invention

However, in case where the front filter disclosed in Patent Document 1 is used in a plasma display panel, there is a problem that the degree that original image light becomes unclear is significant compared to liquid crystal displays. This is because, compared to liquid crystal displays, with a plasma display panel, the distance between the frontmost surface of the front filter and the back plate for outputting image light is long, and the degree of decrease in the sharpness due to diffusion when image light transmits through the frontmost surface of the front filter is more significant.

There is also a problem that it is difficult to suppress glare that occurs when light from the outside having entered inside a plasma display panel is reflected regularly by the surface of the front plate and so on. This is because the sensitivity of refracted light with respect to the degree of roughness of the frontmost surface of the front filter is weak compared to the sensitivity of reflected light. That is, if the frontmost surface is roughened to improve glare by internal reflection, surface diffusion increases and the contrast of image light decreases.

Accordingly, with the plasma display panel disclosed in Patent Document 1 that uses the front filter, it is difficult to allow both improvement of glare and improvement of the sharpness and the contrast of image light.

It is therefore an object of the present invention to provide a plasma display panel that allows both improvement of glare and improvement of the sharpness and the contrast of image light.

Means for Solving the Problem

The plasma display panel according to the present invention employs a configuration which includes: a front plate and a back plate that are placed apart from each other; a partitioning wall that divides discharge space formed between the front plate and the back plate; a fluorescent layer formed in a discharge cell divided by the partitioning wall; electrodes that are aligned in the front plate and the back plate and that cause discharging in the discharge cell; and a front filter that is placed on an viewer side of the front plate, and in which the front filter has on the viewer side at least two resin layers of different refractive indices, and includes fine concaves and convexes on a surface on the viewer side, and on an interface between the two resin layers.

Advantageous Effects of Invention

According to the present invention, the interface between resin layers allows internal diffusion of light from the outside having entered inside the panel, so that it is possible to prevent the roughness of the surface of the front filter and improve glare. Further, it is possible to apply the diffusion effect on the interface more substantially, to light from the outside having entered inside the panel than to image light. By this means, it is possible to allow both improvement of glare and improvement of the sharpness and the contrast of image light.

BEST MODE FOR CARRYING OUT THE INVENTION

Hereinafter, an embodiment of the present invention will be explained in detail with reference to the accompanying drawings.

Figure 1:
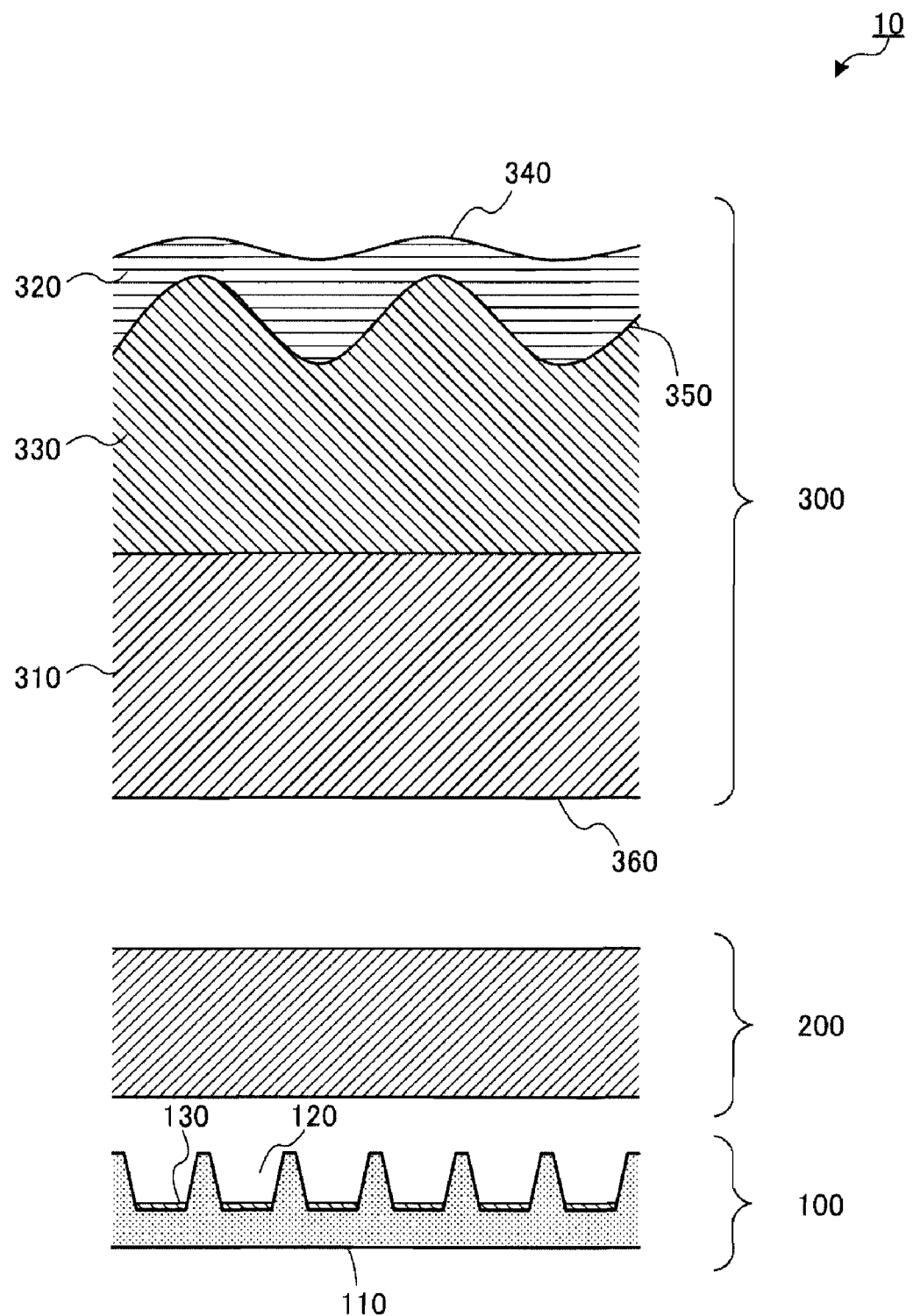
FIG. 1 is a schematic, partial, cross-sectional view of a plasma display panel according to an embodiment of the present invention.

FIG. 1 is a schematic, partial, cross-sectional view of a plasma display panel according to an embodiment of the present invention. FIG. 1 shows only a characteristic configuration of the plasma display panel according to the present invention, and other components will not be shown and explained partially.

As shown in FIG. 1, back plate 100 and front plate 200 that are placed apart from each other, and front filter 300 are overlaid in parallel in this order to form plasma display panel 10. A discharge space for causing plasma discharge is formed in a space between back plate 100 and front plate 200. A predetermined discharge gas mixing helium (He), neon (Ne), xenon (Xe) and argon (Ar) is sealed in the discharge space.

In back plate 100, data electrodes (not shown) covered by an insulator layer and a plurality of partitioning walls 110 placed in a stripe state and in parallel to the data electrodes are formed. The above discharge space are divided into a plurality of sections by partitioning walls 110, to form a plurality of discharge cells 120 which each form a unit light emitting area. In the inner walls of adjacent three discharge cells 120, color of a fluorescent material is changed between red (R), green (G) and blue (B) and applied, on a per discharge cell basis to form fluorescent layer 130.

In front plate 200, various components (not shown) for realizing the function as the plasma display panel such as electrodes, a dielectric layer and a protective film are formed in adequate positions. For example, in front plate 200, although not shown, a plurality of display electrodes formed with pairs of scanning electrodes and sustaining electrodes are provided in a stripe state. Further, in front plate 200, a dielectric layer is formed to cover the display electrodes. Furthermore, in front plate 200, a protective layer is formed on the dielectric layer. The dielectric layer is made of, for example, low-melting point glass. The protective layer is made of, for example, magnesium oxide (MgO).

Front filter 300 is formed by using transparent plate 310 made of, for example, glass, as a base material, and overlaying an electromagnetic-wave shielding filter, infrared cut filter and color adjusting filter (all of them are not shown). Further, front filter 300 is formed by overlaying first resin layer 320 and second resin layer 330, both made of resin, as anti-glare layers, on the viewer side of transparent plate 310. First resin layer 320 is placed closest to the viewer side. Second resin layer 330 is placed in close contact with first resin layer 320.

Front filter 300 has concave-convex surface 340 in which fine concaves and convexes are formed, as the surface on the viewer side, that is, as the air interface of first resin layer 320. Further, front filter 300 has concave-convex interface 350 in which fine concaves and convexes are formed, as the interface between first resin layer 320 and second resin layer 330. Furthermore, as the material for first resin layer 320 and the material for second resin layer 330, substances that make the difference in refractive indices of these materials between 0.01 and 0.03 are used.

In plasma display panel 10 formed as described above, when voltage is applied between electrodes, discharging occurs in discharge cells 120, and helium atoms in the mixed gas are excited and produce ultraviolet rays. Then, these ultraviolet rays excite fluorescent layer 130, and produce visible light.

Part of light from the outside (hereinafter simply "outer light") that causes glare is reflected on concave-convex surface 340.

Reflections on concave-convex surface 340 are made irregular reflections by the fine concave-convex structures, and, as a result, reduce glare. That is, the degree of glare due to reflection on concave-convex surface 340 is determined based on the degree of diffusion that works on reflected light in concave-convex surface 340.

By contrast with this, most of outer light having entered inside the panel (hereinafter "incoming light") without being reflected on concave-convex surface 340 is reflected on air interface 360 on the front plate 200 side of transparent plate 310. Although incoming light is incident on concave-convex interface 350, incoming light is not reflected much on concave-convex interface 350. This is because the difference between the refractive indices of first resin layer 320 and second resin layer 330 is small. That is, this is because the reflectivity of concave-convex interface 350 is little, and the refraction effect becomes predominant in concave-convex interface 350.

Prior to being reflected on air interface 360, incoming light is refracted on concave-convex surface 340 and concave-convex interface 350. After being reflected on air interface 360, incoming light is refracted on concave-convex interface 350 and concave-convex surface 340. Accordingly, although individual refraction effects of incoming light reflected on air interface 360 are small, these refraction effects add up, so that incoming light is diffused sufficiently and returns to the direction of the viewer. That is, the degree of glare due to reflection on air interface 360 is determined based on the degree of diffusion that works on incoming light in concave-convex surface 340 and the degree of diffusion that works on incoming light in concave-convex interface 350.

In order to reduce glare due to reflection on air interface 360, it is necessary to increase the degree of diffusion (hereinafter "refraction diffusion") due to refraction that works on incoming light in concave-convex surface 340 and the degree of refraction diffusion that works on incoming light in concave-convex interface 350. However, if the degree of refraction diffusion by concave-convex surface 340 increases, surface diffusion increases and the contrast of image light decreases significantly. Accordingly, it is not desirable to significantly increase the degree of refraction diffusion by concave-convex surface 340.

The inventors of the present invention found out that, in the surface of the front filter of a conventional plasma display panel, surface diffusion influences mainly the degree of glare, and interface diffusion influences mainly the sharpness of image light. From the above, the inventors of the present invention found out that, by mainly utilizing surface diffusion as a means for reducing regular reflections on the surface of the front filter and by mainly utilizing interface diffusion as a means for reducing regular reflections on the back surface of the front filter, it is possible to allow both improvement of glare and improvement of the sharpness and the contrast of image light.

Hence, plasma display panel 10 according to the present embodiment limits the degree of refraction diffusion on concave-convex surface 340, and instead utilizes refraction diffusion on concave-convex interface 350. By this means, it is possible to prevent the roughness of the surface of front filter 300 and improve glare.

Note that the sharpness of image light is influenced by the distance between the display section and the diffusion plane, that is, by the distance between back plate 100 and concave-convex surface 340. Therefore, according to this distance, it is necessary to adequately control the degree of diffusion (hereinafter "reflection diffusion") that works on reflected light in concave-convex surface 340, the degree of refraction diffusion on concave-convex surface 340 and the degree of refraction diffusion on concave-convex interface 350. Here, the degree of reflection diffusion and the degree of refraction diffusion on concave-convex surface 340 and the degree of refraction diffusion on concave-convex interface 350 will be collectively referred to as "the diffusion condition."

Hereinafter, control of the diffusion condition in plasma display panel 10 will be explained.

First, the distance that serves as the reference to control the diffusion condition will be explained.

Figure 2:
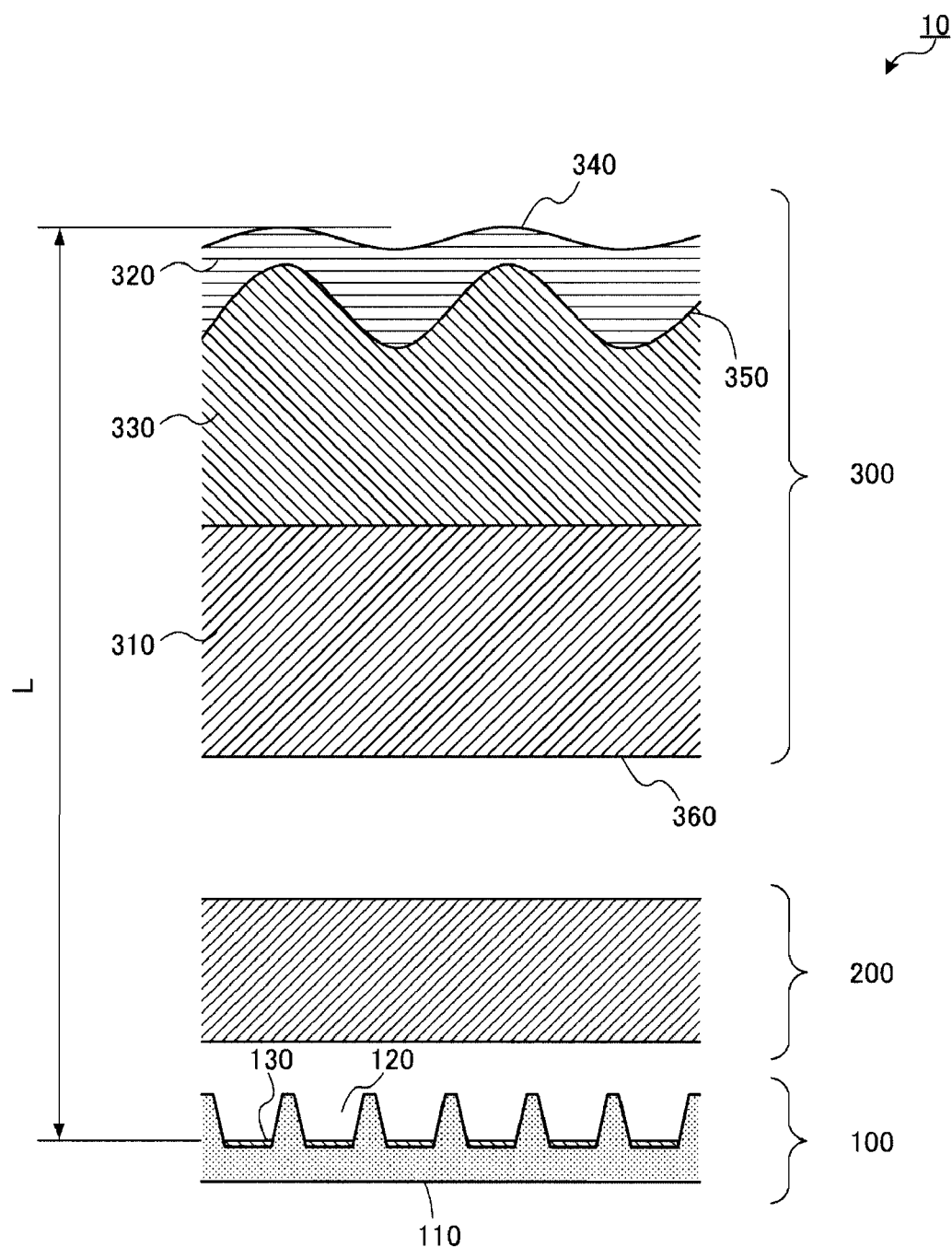
FIG. 2 illustrates distance that serves as a reference to control the diffusion condition, according to the present embodiment.

FIG. 2 illustrates the distance that serves as the reference to control the diffusion condition, and matches FIG. 1.

Here, as shown in FIG. 2, distance L that serves as the reference to control the diffusion condition is defined as the distance from fluorescent layer 130, which is the display section of plasma display panel 10, to concave-convex surface 340 of front filter 300. Note that distance L is the value (hereinafter, "air conversion distance") adding the values acquired by dividing the length of each material that forms the section between fluorescent layer 130 and concave-convex surface 340, by the refractive index of each material. For example, when one millimeter glass with a refractive index of 1.5 and one millimeter air with a refractive index of 1.0 are overlaid, the air conversion distance can be calculated as 1/1.5+1/1=1.67.

Image light from fluorescent materials travels toward the viewer side while being diffused, and is observed by the viewer. Image light is subjected to the diffusion effects when transmitting through concave-convex interface 350 and concave-convex surface 340, the sharpness of an image observed by the viewer deteriorates compared to the original image. The sharpness deteriorates more significantly when air conversion distance L is longer. This can be explained as follows. In the diffusion plane provided between light sources and the viewer, transmission areas for light from light sources may be regarded as secondary light sources. Generally, light from light sources is emitted in all directions, and therefore, the sizes of secondary light sources increase when the distance between the diffusion plane and light sources is longer. Further, when the sizes of secondary light sources are greater, the sharpness of images from light sources decreases.

Next, the diffusion condition for maintaining the sharpness of image light observed on the viewer side will be explained.

Here, MTF (Modulation Transfer Function) is employed as an indicator to represent the sharpness of image light observed on the viewer side. MTF is an evaluation function that indicates to what extent the sharpness of the original image can be reproduced. Here, particularly, MTF at time image light transmits through front filter 300 will be referred to as "transmission MTF."

The highest spatial frequency to be reproduced in an image of a display apparatus depends on the pitches between display elements, and is about 0.6 lp/mm (line-pair per millimeter) with around 40-inch plasma display panels. Further, the lower limit value of transmission MTF that is allowed as the sharpness of image light is 0.7. Accordingly, when the spatial frequency is 0.6 lp/mm, transmission MTF=0.7 is employed as the minimum allowable value for the sharpness of image light. If transmission MTF is 0.7 or greater, the sharpness of image light can be regarded to be maintained.

Note that, for example, if a front filter having transmission MTF=0.7 with respect to 0.6 lp/mm is placed in the front of the 42-inch plasma display panel, although there is no problem when an image is observed from the front direction, the decrease in the sharpness of an image is recognized when the image is observed from oblique directions. This is because the distance between the front filter and the fluorescent layer measured along the optical path to observe is longer in the case where an image is observed from the front direction than in the case where an image is observed from oblique directions, and, as a result, transmission MTF in the oblique directions seems to become lower than 0.7. Accordingly, although transmission MTF of front filter 300 is 0.7 with the present embodiment, it is desirable to secure transmission MTF=0.7 or greater, at angles from oblique directions in which images are observed by the viewer.

Further, the degree of reflection diffusion and the degree of refraction diffusion are proportional to inclining angles of fine portions of concaves and convexes, and, therefore a characteristic value that indicates the diffusion condition for front filter 300 adopts a haze factor that indicates the rate of diffused transmission light of all transmission light when visible light is radiated. The haze factor of entire front filter 300 is determined based on the degrees of refraction diffusion on concave-convex surface 340 and concave-convex interface 350.

Figure 3:
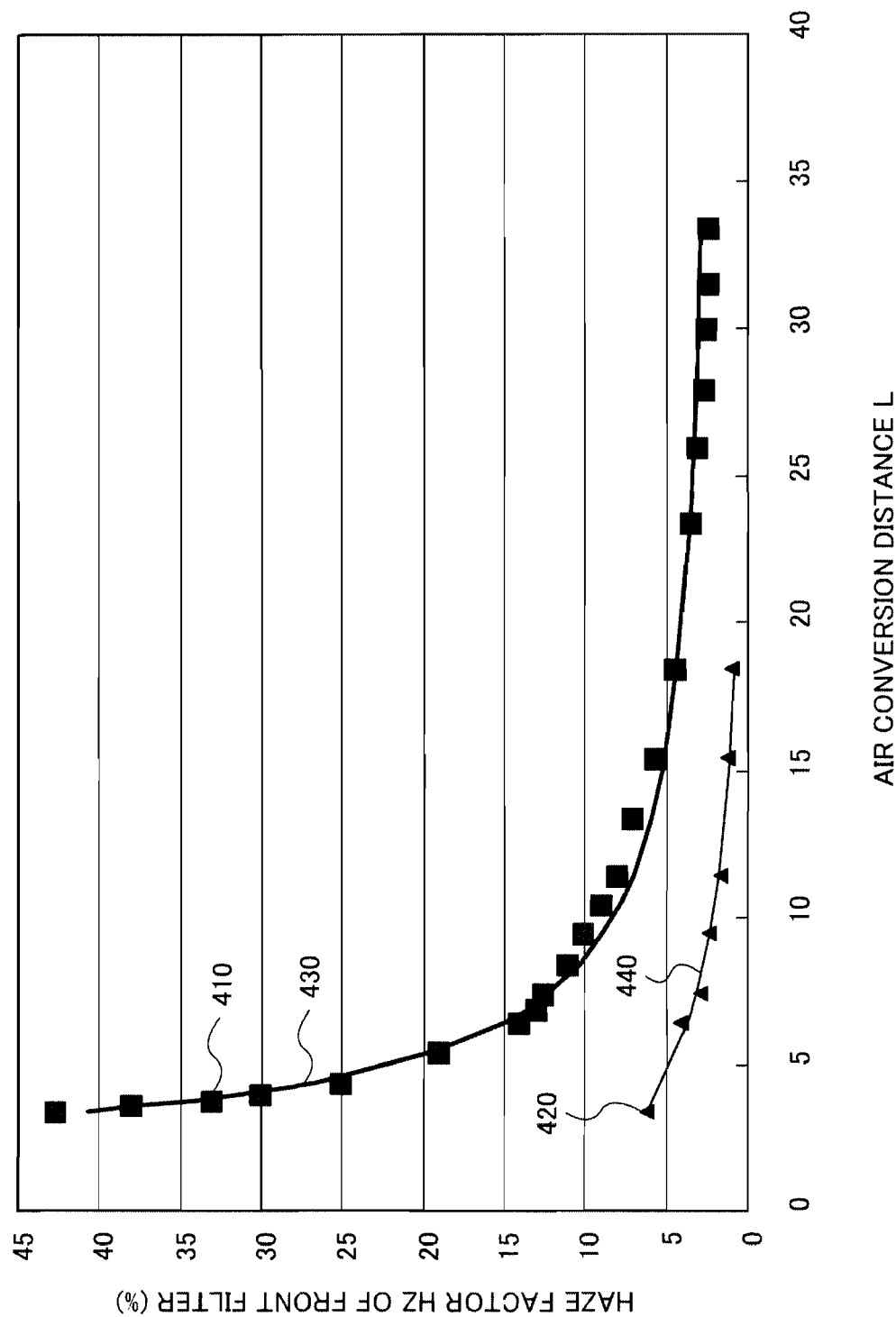
FIG. 3 shows the relationship between the diffusion condition for a front filter and an air conversion distance when a minimum allowable value for the sharpness of image light is determined, according to the present embodiment.

FIG. 3 shows the relationship between air conversion distance L and the diffusion condition for front filter 300 when the minimum allowable value for the sharpness of image light observed on the viewer side is determined In FIG. 3, the horizontal axis represents air conversion distance L explained in FIG. 2 in units of millimeters (mm), and the vertical axis represents the haze factor of front filter 300 in units of percentages (%). Further, point group 410 represented by squares plots combinations of air conversion distance L and haze factor HZ of the front filter which are acquired in the experiment and in which transmission MTF 0.7 holds with respect to spatial frequency 0.6 lp/mm. Furthermore, point group 420 represented by triangles plots combinations of air conversion distance L and haze factor HZ of the front filter which are acquired in the experiment and in which transmission MTF 0.95 holds with respect to spatial frequency 0.6 lp/mm. When the value of transmission MTF is closer to 1, the degree of diffusion is lower and the sharpness of image light can be maintained high.

Haze factor HZ of front filter 300 becomes infinite when air conversion distance L is zero. Further, when haze factor HZ is zero, transmission MTF of front filter 300 does not decrease even if air conversion distance L is infinite. Furthermore, if the square of a correlation coefficient exceeds 0.7, the regression curve can be regarded to be sufficiently accurate. In view of these, assuming that haze factor HZ can be represented by a polynomial of 1/L, if the regression curve of point group 410 is calculated according to a polynomial approximation of the lowest order where the square of the correlation coefficient exceeds 0.7, following equation 1 holds.

[1]

$$HZ = \frac{346.38}{L^2} + \frac{32.061}{L} + 1.6 \qquad \text{(Equation 1)}$$

Curve 430 represents equation 1. That is, curve 430 represents a contour line of the diffusion condition in which transmission MTF=0.7 holds with respect to spatial frequency 0.6 lp/mm. Curve 430 takes a higher haze factor when air conversion distance L is shorter, and decreases like a quadric curve following the increase in air conversion distance L. Accordingly, in case where a structure that increases air conversion distance L is adopted, it is necessary to decrease the haze factor of front filter 300 in order to maintain the sharpness of image light by maintaining transmission MTF 0.7.

Similarly, by calculating the regression curve of point group 420, following equation 2 holds.

[2]

$$HZ = -\frac{43.456}{L^2} + \frac{37.883}{L} - 1.1371 \quad \text{(Equation 2)}$$

Curve 440 represents equation 2. That is, curve 440 represents a contour line of the diffusion condition in which transmission MTF=0.95 holds with respect to spatial frequency 0.6 lp/mm.

Curve 440 is positioned in the lower left side of curve 430 without intersecting curve 430. Further, for example, when one of values of haze factor HZ and air conversion distance L is fixed and the other value is decreased, transmission MTF naturally increases. That is, in FIG. 3, the left side or the lower side of curve 430 is an area where transmission MTF is higher than 0.7 and where the sharpness of image light is maintained. Further, the right side or the upper side of curve 430 is an area where transmission MTF is lower than 0.7 and where the sharpness of image light is not maintained.

Accordingly, the sharpness of image light is maintained when haze factor HZ of front filter 300 meets following equation 3.

[3]

$$HZ \le \frac{346.38}{L^2} + \frac{32.061}{L} + 1.6 \quad \text{(Equation 3)}$$

By forming front filter 300 to meet equation 3, it is possible to prevent the decrease in the sharpness of image light. That is, from the perspective of improvement in the sharpness of image light, equation 3 specifies the maximum value of haze factor HZ of front filter 300 according to air conversion distance L between the display section and concave-convex surface 340. If haze factor HZ of front filter 300 exceeds the maximum value specified according to equation 1, the sharpness of image light decreases, which is not desirable for display apparatuses.

Next, the diffusion condition for reducing glare and maintaining the contrast of image light observed on the viewer side will be explained.

Here, MTF is employed as the degree of glare and an indicator of the contrast of image light observed on the viewer side. Here, particularly, MTF at time outer light is reflected on front filter 300 will be referred to as "reflection MTF."

With glare in a display apparatus, the spatial frequency that influences on the visibility of images the most depends on the surrounding environment, and is generally 0.06 lp/mm. Further, the upper limit value of reflection MTF that is allowed as the degree of glare is 0.3. Accordingly, when the spatial frequency is 0.06 lp/mm, reflection MTF=0.3 is employed as the maximum value of the allowable degree of glare. When reflection MTF is 0.3 or less, glare can be regarded to be within the allowable range.

Further, a characteristic value indicating the diffusion condition for each surface adopts a value acquired by dividing surface roughness Ra (i.e. center-point average roughness) calculated from the three-dimensional shape of each plane, by an average pitch of concaves and convexes.

Figure 4:
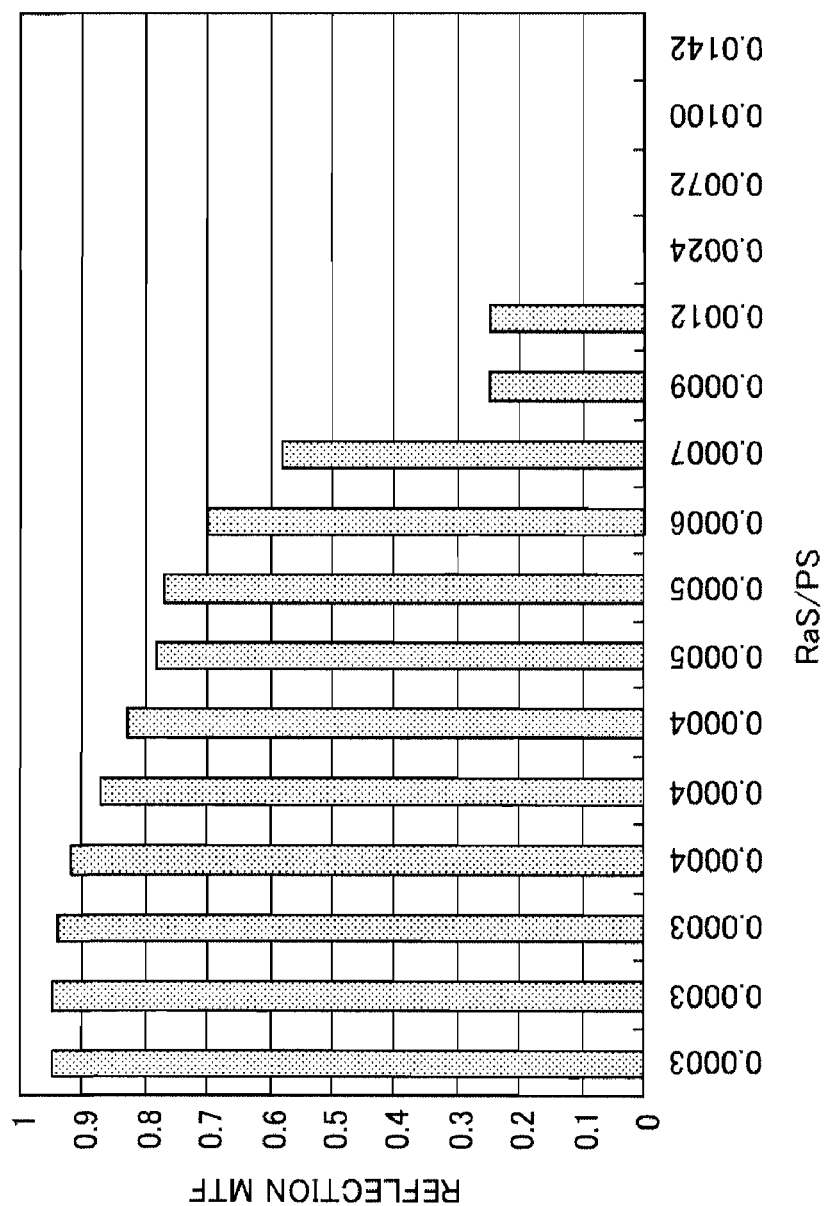
FIG. 4 is a first diagram showing change in reflection MTF when the diffusion condition is changed, according to the present embodiment.

FIG. 4 shows change in reflection MTF when the surface roughness/average pitch in concave-convex surface 340 is changed without changing the surface roughness/average pitch in concave-convex interface 350. Hereinafter, the surface roughness and the average pitch in concave-convex interface 350 are represented as "RaI" and "PI," respectively, and the surface roughness and the average pitch in concave-convex surface 340 are represented as "RaS" and "PS," respectively.

As shown in FIG. 4, reflection MTF takes a value closer to "1" when RaS/PS of concave-convex surface 340 is lower, and decreases following the increase in the value of RaS/PS. That is, when the value of RaS/PS is greater, glare decreases. For example, when RaS/PS is 0.0009 or greater, reflection MTF is 0.3 or less.

Figure 5:
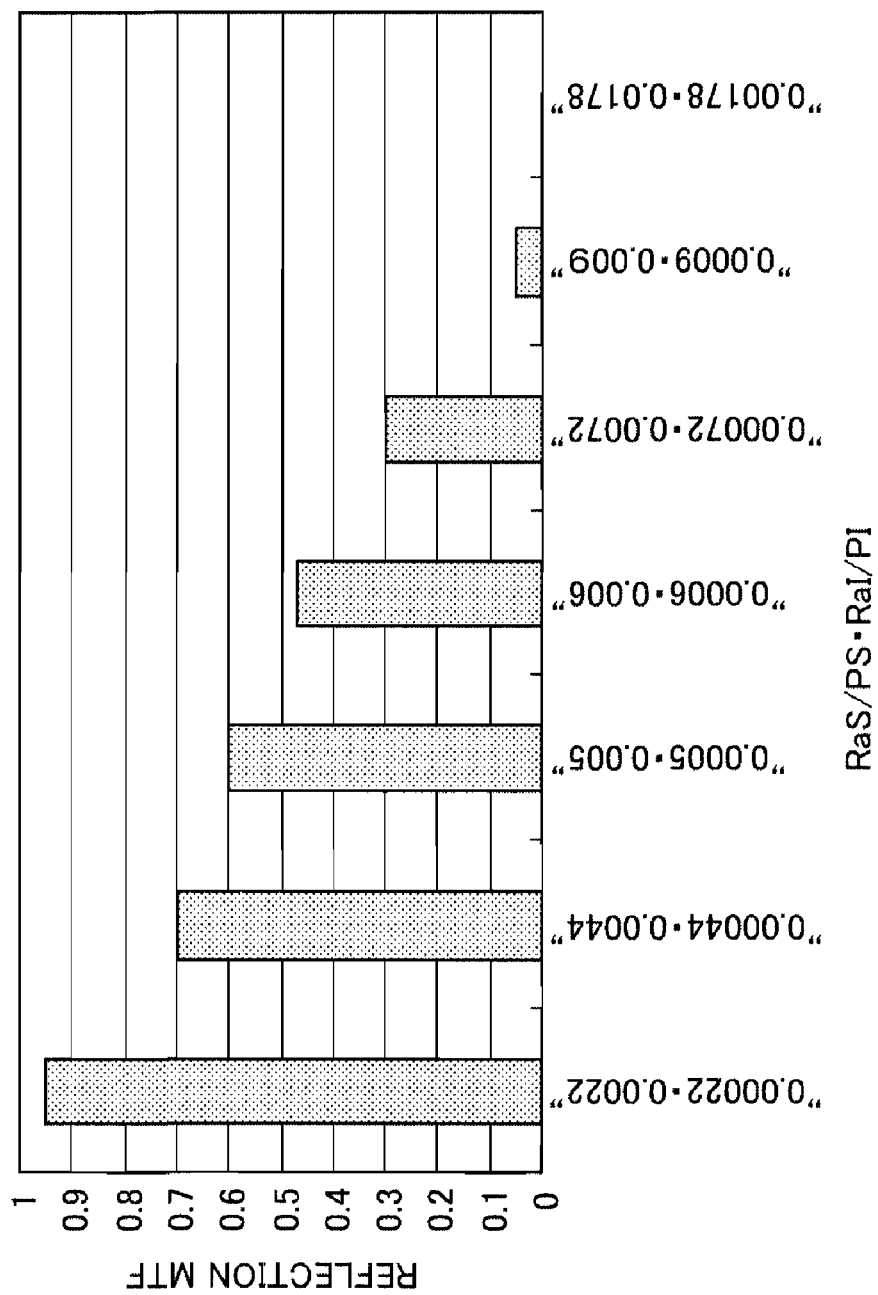
FIG. 5 is a second diagram showing change in reflection MTF when the diffusion condition is changed, according to the present embodiment.

FIG. 5 shows change in reflection MTF when RaI/PI of concave-convex interface 350 and RaS/PS of concave-convex surface 340 are changed proportionally.

As shown in FIG. 5, reflection MTF decreases following the increase in the values of RaI/PI and RaS/PS.

Figure 6:
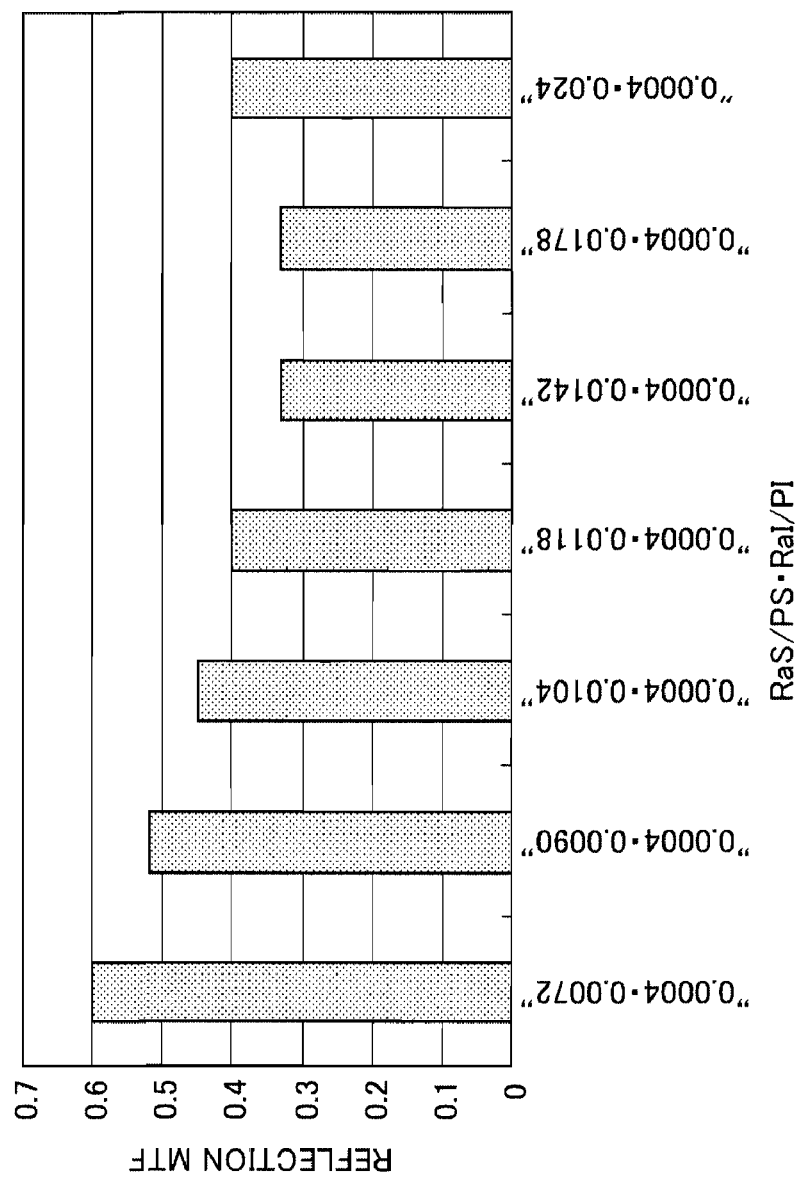
FIG. 6 is a third diagram showing change in reflection MTF when the diffusion condition is changed, according to the present embodiment.

FIG. 6 shows change in reflection MTF when RaI/PI of concave-convex interface 350 is changed without changing RaS/PS of concave-convex surface 340.

As shown in FIG. 6, up to around RaI/PI=0.016, reflection MTF decreases following the increase in the value of RaI/PI.

Figure 7:
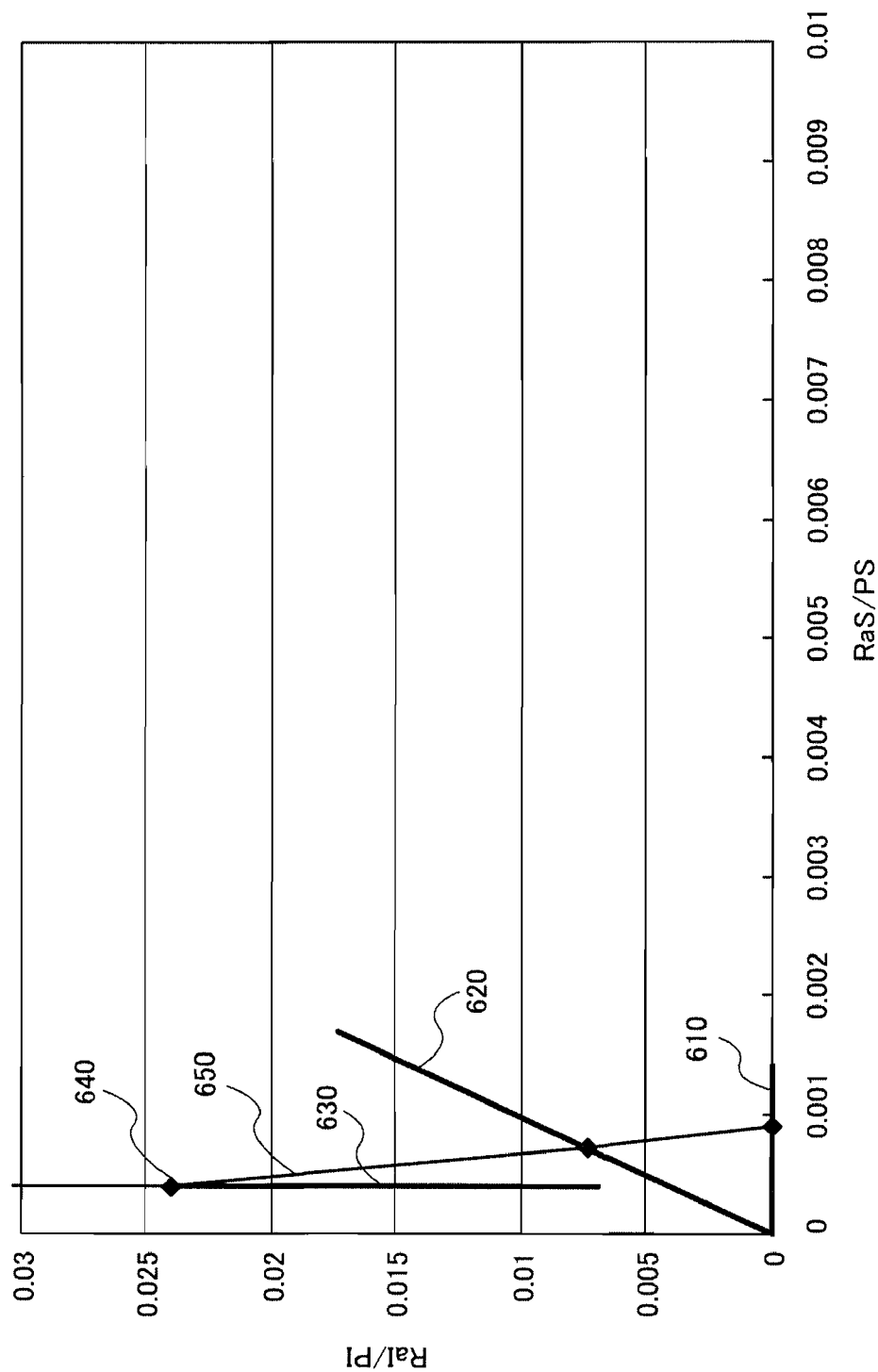
FIG. 7 shows the relationship between RaS/PS and RaI/PI when a maximum allowable value for glare of light from the outside is determined, according to the present embodiment.

FIG. 7 shows the relationship between RaS/PS of concave-convex surface 340 and RaI/PI of concave-convex interface 350 when the maximum allowable value for glare of outer light is determined.

In FIG. 7, the diffusion conditions adopted in FIG. 4 to FIG. 6 are indicated as lines 610 to 630, respectively. In FIG. 7, point group 640 represented by diamonds plots combinations of RaS/PS and RaI/PI in which reflection MTF=0.3 holds with respect to spatial frequency 0.06 lp/mm. When the value of reflection MTF is closer to "1," reflection MTF indicates that the degree of diffusion and the contrast can be maintained lower and higher, respectively.

The value of reflection MTF is found as a result of taking into account both the states of reflection on concave-convex surface 340 and reflection on air interface 360. Accordingly, when the value of RaS/PS is small, no matter how great the value of RaI/PI is made, it is not possible to make the value of RaS/PS smaller than a certain value. Further, although reflection on concave-convex surface 340 is irrelevant to RaI/PI, reflection on air interface 360 relates to both RaS/PS and RaI/PI. That is, as long as the degree of reflection diffusion on concave-convex surface 340 is low, no matter how light reflected on air interface 360 is diffused, the value of reflection MTF cannot be made lower than a certain value, and, when reflection MTF is 0.3 and the value of RaS/PS is zero, the value of RaI/PI becomes infinite. In view of these, assuming that RaS/PS can be represented by a polynomial of RaI/PI, by calculating the regression curve of point group 640 according to a polynomial approximation of the lowest order where the square of a correlation coefficient exceeds 0.7, following equation 4 holds.

[4]

$$\frac{RaS}{PS} = 0.103 \times \left(\frac{RaI}{PI}\right)^2 - 0.0208 \times \frac{RaI}{PI} + 0.0009 \quad \text{(Equation 4)}$$

Curve 650 represents equation 4. That is, curve 650 represents a contour line when reflection MTF is 0.3 with respect to spatial frequency 0.06 lp/mm.

As is clear from curve 650, around reflection MTF=0.3, the value of reflection MTF, that is, the intensity of glare, is influenced significantly by change in RaS/PS in concave-convex surface 340, instead of change in the value of RaI/PI in concave-convex interface 350. In FIG. 7, the right side or the upper side of curve 650 is an area where reflection MTF is lower than 0.3, and glare can be regarded to be within the allowable range. Further, the left side or the lower side of curve 650 is an area where reflection MTF is higher than 0.3, and glare can be regarded to be outside the allowable range.

Accordingly, glare is within the allowable range when, in relation to RaI/PI of concave-convex interface 350, RaS/PS of concave-convex surface 340 meets following equation 5.

[5]

$$\frac{RaS}{PS} \geq 0.103 \times \left(\frac{RaI}{PI}\right)^2 - 0.0208 \times \frac{RaI}{PI} + 0.0009 \quad \text{(Equation 5)}$$

By forming front filter 300 to meet equation 5, glare can be regarded to be within the allowable range. That is, in terms of improvement of glare, equation 5 specifies the relationship between the allowable range of surface diffusion and the degree of internal diffusion. When RaS/PS of concave-convex surface 340 goes below the lower limit specified by equation 5, the effect of glare improvement decreases.

By contrast with this, when the value of RaS/PS of concave-convex surface 340 increases, the contrast of images decreases. This is because RaS/PS is the value acquired by dividing the height of a mountain of an concave-convex surface by the length of the bottom of the mountain, that is, the value related to the inclination of the mountain, and, when the inclination of the mountain is greater, outer light having entered at a greater incident angle is reflected on the inclining surface of the mountain and is more likely to reach the viewer in the front. The upper limit value of RaS/PS that is allowed as the contrast of images is 0.003. Accordingly, it is desirable that the value of RaS/PS meets following equation 6.

[6]

$$\frac{RaS}{PS} \leq 0.003 \quad \text{(Equation 6)}$$

By forming front filter 300 to meet equation 6, it is possible to prevent the decrease in the contrast when outer light enters. When the value of RaS/PS exceeds the upper limit of equation 6, the contrast decreases significantly with respect to outer light. That is, from the perspective of improvement of contrast, equation 6 specifies the range of RaS/PS in concave-convex surface 340.

By determining the diffusion condition for plasma display panel 10 and forming plasma display panel 10 according to the determined the diffusion condition to meet above equation 3, equation 5 and equation 6, it is possible to allow both improvement of glare and improvement of the sharpness and the contrast of image light.

As explained above, with plasma display panel 10 according to the present embodiment, front filter 300 has first resin layer 320 and second resin layer 330 of different refractive indices, on the viewer side, and have fine concaves and convexes not only in the surface on the viewer side but also in the interface between first resin layer 320 and second resin layer 330. By this means, not only the surface but also the interface between resin layers allow internal diffusion of outer light having entered inside the panel, so that it is possible to prevent the roughness of the surface of front filter 300 and prevent glare. Moreover, while image light transmits through the interface once, incoming light transmits through the interface twice on a round trip, so that it is possible to apply the diffusion effect on the interface more substantially, to outer light having entered inside the panel than to image light. That is, it is possible to prevent glare in a state where the decreases in the sharpness and the contrast of image light are suppressed, and provide images of high sharpness without worrying glare in case where plasma display panel 10 is installed in a bright place.

Further, plasma display panel 10 is formed according to the diffusion condition determined based on the allowable ranges of the degree of glare, the sharpness of image light and the contrast of image light, so that the degree of glare, the sharpness of image light and the contrast of image light can be accommodated in the allowable ranges. Further, the diffusion conditions are specified by equations using characteristic values, so that it is possible to readily design plasma display panel 10 to meet the specified condition.

Furthermore, the values of allowable ranges of the degree of glare, the sharpness of image light and the contrast of image light described with the present embodiment are only examples, and by no means limit the above-described allowable ranges. According to the size, resolution, the place of use and environment of use of a plasma display panel, it is possible to adopt various values to the spatial frequency and MTF in transmission and reflection. In this case, the diffusion condition for the plasma display panel only needs to be controlled according to the methods explained in FIG. 2 to FIG. 7.

The disclosure of Japanese Patent Application No. 2007-306145, filed on Nov. 27, 2007, including the specification, drawings and abstract, is incorporated herein by reference in its entirety.

INDUSTRIAL APPLICABILITY

The plasma display panel according to the present invention is useful as a plasma display panel that allows both improvement of glare and improvement of the sharpness and the contrast of image light.

The invention claimed is:

1. A plasma display panel comprising:

a front plate and a back plate that are placed apart from each other;

a partitioning wall that divides discharge space formed between the front plate and the back plate;

a fluorescent layer formed in a discharge cell divided by the partitioning wall;

electrodes that are aligned in the front plate and the back plate and that cause discharging in the discharge cell; and a front filter that is placed on an viewer side of the front plate, wherein the front filter has on the viewer side at least two resin layers of different refractive indices, and includes fine concaves and convexes on a surface on the viewer side, and on an interface between the two resin layers; and a following equation is satisfied when a haze factor of the front filter is HZ and an air conversion distance is L, the air conversion distance being a value adding values acquired by dividing lengths of materials that form a section between the fluorescent layer and the surface of the front filter on the viewer side, by refractive indices of the materials:

$$HZ \leq \frac{346.38}{L^2} + \frac{32.061}{L} + 1.6.$$

2. The plasma display panel according to claim 1, wherein a following equation is satisfied when a center-point average roughness of concaves and convexes on the surface of the front filter on the viewer side is RaS, an average pitch of the concaves and convexes on the surface of the front filter on the viewer side is PS, a center-point average roughness on the interface of the front filter is RaI and an average pitch of the concaves and convexes on the interface is PI:

$$\frac{RaS}{PS} \geq 0.103 \times \left(\frac{RaI}{PI}\right)^2 - 0.0208 \times \frac{RaI}{PI} + 0.0009. \qquad [2]$$

* * * * *